O. S. HERSHEY.
AUTOMOBILE LOCK.
APPLICATION FILED MAY 24, 1919.
1,417,603. Patented May 30, 1922.
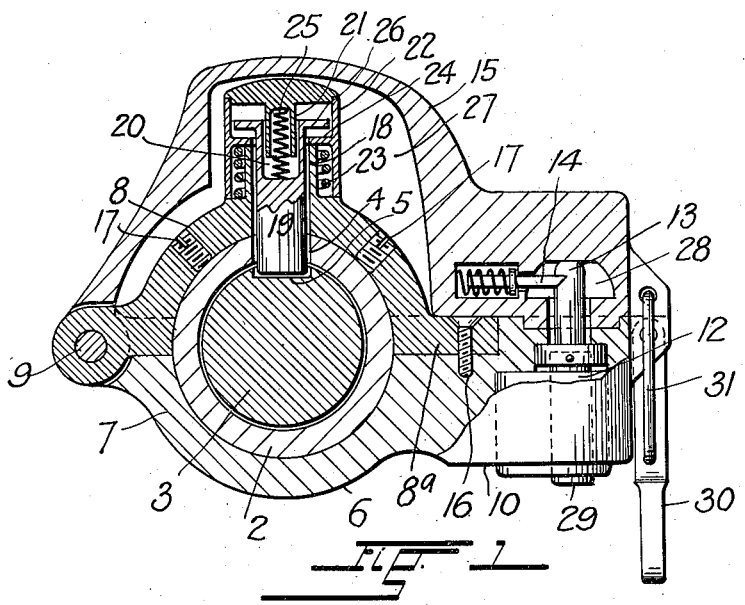
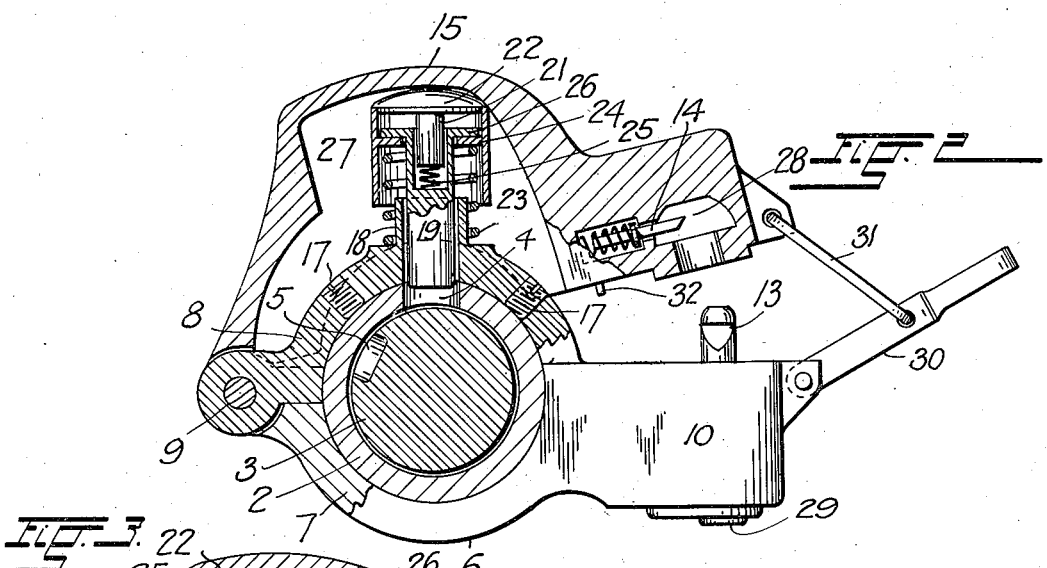
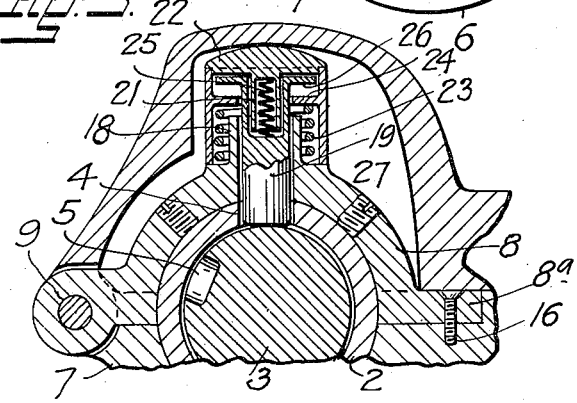
INVENTOR:
O. S. Hershey.
BY
ATTORNEY.

UNITED STATES PATENT OFFICE.

ORVILLE SCOTT HERSHEY, OF DENVER, COLORADO, ASSIGNOR TO HERSHEY MANUFACTURING COMPANY, A CORPORATION OF COLORADO.

AUTOMOBILE LOCK.

1,417,603.   Specification of Letters Patent.   Patented May 30, 1922.

Application filed May 24, 1919. Serial No. 299,402.

*To all whom it may concern:*

Be it known that I, ORVILLE S. HERSHEY, a citizen of the United States, residing at Denver, in the county of Denver and State of Colorado, have invented certain new and useful Improvements in Automobile Locks, of which the following is a specification.

This invention relates to improvements in automobile locks and more particularly to locks of the type used in connection with the steering column of a motor-driven vehicle, to fasten the shaft extending therethrough against rotation.

It is the primary object of my invention to provide a lock of simple, practical and very efficient construction which is permanently fastened to the steering column of an automobile and which includes a pivoted hasp-member adapted to lock the steering shaft to the column, and a key-controlled lock to secure the hasp in its operative position.

Another object of my invention is to provide a locking device which may be set in its operative condition irrespective of the position of the steering rod.

With these and other objects in view, all of which will fully appear in the course of the following description, my invention consists in the novel features of construction and arrangement of parts shown in the accompanying drawings in which like characters of reference designate corresponding parts throughout the several views, and in which—

Figure 1 is a sectional plan view of my improved lock in its locked condition with relation to the steering column and steering shaft of an automobile;

Figure 2, a similar view showing the lock in the open position; and

Figure 3, a fragmentary section of the lock set for operation and before the steering shaft is locked.

Referring more specifically to the drawings, the reference character 2 designates the steering column of a motor driven vehicle, and 3 the steering shaft which is rotatably fitted therein.

The column and the shaft have openings 4 and 5 which in a certain position of the shaft are in register for the reception of a locking bolt which in practice prevents rotation of the shaft within the column.

The shaft has been shown in the drawings to be of solid construction and the bolt-receiving opening is made in the form of a shallow recess. In many automobiles, however, the shaft is tubular, in which case the opening extends throughout the thickness of its wall.

My improved lock consists of a collar 6 adapted to be clamped around the steering column and composed of two sections 7 and 8 which are hinged together as at 9.

One of the sections 7 has an integral laterally projecting block 10 which provides a housing for a key-controlled lock 12, the bolt 13 of which cooperates with a spring-urged latch 14 on the hasp-member 15 of the lock, which is pivotally mounted upon the pintle of the hinge connection of the collar-sections and which will hereinafter be more fully described.

The block 10 of the section 7, has, furthermore, a recess to receive a lip $8^a$ on the other section when the parts are closed upon the steering column.

A countersunk screw 16 passing through an aperture in the lip fastens the collar-sections together and a pair of set screws 17 in threaded openings of the sections 8 engage the exterior surface of the steering column to aid in fastening the collar immovably upon the same.

The collar has a tubular projection 18 in which a locking bolt 19 which in practice cooperates with the alined openings of the steering column and the shaft to lock the latter against rotation, is slidably fitted.

The bolt has in its outer end an axial socket 20 partially occupied by a socketed pin 21 extending axially inwardly from a cap 22 loosely placed around the outer portion of the bolt. A coiled spring 23 bearing against a shoulder of the collar around its tubular projection, engages an internal flange 24 of the cap, and a similar weaker spring 25 is placed within the before-mentioned alined sockets of the bolt and the inwardly projecting pin of the cap.

A head 26 at the outer end of the bolt extends within the space of the cap between its closed end and its internal flange, which is sufficiently wide to permit of a limited movement of the bolt against the pressure of the spring 25 which normally holds its head in engagement with the flange.

The hereinbefore referred to hasp-member 15 of the lock which is pivotally mounted upon the pintle of the hinge-connection between the sections of the collar, has a cavity 27 into which the section 8 of the collar is admitted when the hasp is in its closed position.

The hasp is held in the open position by engagement with the cap 22 which is held apart from the collar by the spring 23 and which by the engagement of its flange with the head of the bolt, holds the latter in its retracted position as shown in Figure 2 of the drawings.

When the bolt is in this position its end projects inside the opening of the steering column so that accidental displacement of the lock is positively prevented.

The hasp has an opening 28 to receive the bolt 13 of the key-controlled lock and it carries the before-mentioned spring-catch 14 which cooperates with the bolt to secure the hasp in its closed position.

The lock has a hole for the insertion of a key at a point of the outer face of the block extension of the collar indicated by the reference numeral 29 and inasmuch as it may be of any suitable character and design its construction has not been shown in detail in the drawings.

A toggle lever the members 30 and 31 of which are pivotally attached to the ends of the collar and the hasp remote from their pivotal connection, facilitates the adjustment of the hasp to its closed position and cooperates with the spring 23 to hold the same in the open position.

After the collar is clamped around the steering column of an automobile as shown in the drawings, with its bolt projecting into the opening 4 of the same, the hasp may be set in its operative position, irrespective of the position of the opening in the steering shaft with relation to that of the column.

When the hasp is moved to its closed position by adjustment of the toggle-lever, its pressure upon the cap compresses the spring 23 until the cap is brought into engagement with the surface of the collar which occurs at the same time that the hasp engages the projecting block of the collar section 6 and the bolt 13 of the lock 12 is brought into cooperative relation to the spring catch 14.

If at the time the lock is set the opening in the steering shaft is not in line with that of the column, the locking bolt upon being brought into engagement with the circumferential surface of the shaft moves inwardly by compression of the spring 25 as shown in Figure 3 of the drawings and it remains in this position until by rotation of the steering shaft its opening is brought in alinement with that of the column, when by expansion of the spring the bolt is moved into the opening of the shaft thereby locking it against further rotation.

The hasp is unlocked by turning the bolt of the lock by a key inserted through its hole and by releasing the toggle-lever, after which the hasp is moved to its open position by expansion of the spring 23 and the bolt is withdrawn from the opening in the steering shaft.

Having thus described my improved automobile lock in the best form at present known to me, it will be understood that variations in the construction and arrangement of its cooperative parts may be resorted to within the spirit of my invention as set forth in the following claims:

What I claim and desire to secure by Letters-Patent is:

1. A device of the character described comprising a collar adapted to be fixed around an automobile steering column, and having an opening to receive a locking bolt, a hasp pivoted on the collar to close upon the same, a locking-bolt permanently held in the opening of the collar, adapted to be projected inwardly of the same by engagement of the hasp, and a lock to secure the hasp in its closed position on the collar.

2. A device of the character described comprising a collar adapted to be fixed around an automobile steering-column, and having an opening to receive a locking bolt, a hasp pivoted on the collar to close upon the same, a locking bolt in the opening of the collar, adapted to be projected inwardly of the same by movement of the hasp, a toggle-lever on the collar, acting upon the hasp, and a lock to secure the hasp in its closed position on the collar.

3. A device of the character described comprising a collar adapted to be fixed around an automobile steering-column, a hasp pivoted on the collar to close upon the same, a spring-held locking bolt on the collar, adapted to be projected inwardly of the same by movement of the hasp and having a spring-controlled independent movement when the hasp is closed upon the collar, and a lock to secure the hasp in its closed position on the collar.

4. A device of the character described comprising a collar adapted to be fixed around an automobile steering-column, a lock-controlled operating medium on the collar, a cap engaged by the said medium, a headed locking bolt on the collar, adapted to be projected inwardly of the same and having a movement in the cap, a spring normally holding the bolt and the cap in a retracted position, and a spring yieldingly opposing the movement of the bolt in the cap.

5. A device of the character described comprising a collar adapted to be fixed around an automobile steering-column, a lock-controlled operating medium on the collar, a cap engaged by the said medium and having an internal flange, a locking-bolt on the collar, adapted to be projected inwardly of the same and having a head within the cap, a spring between the collar and the flange of the cap, and a spring normally holding the head of the bolt against the flange in the cap.

6. A device of the character described comprising a collar adapted to be fixed around an automobile steering column, a lock-controlled operating-medium on the collar, a locking bolt on the collar adapted to be moved inwardly thereof by movement of said medium, and capable of further inward movement independent of the same, and a spring acting upon the bolt to control its inward movement.

7. A device of the character described comprising a collar adapted to be fixed around an automobile steering column, a lock-controlled operating-medium on the collar, a locking bolt on the collar adapted to be moved inwardly thereof by movement of said medium, and capable of further inward movement independent of the same, and springs of unequal strengths acting upon the bolt, the one to control its inward and the other its outward movement.

8. A device of the character described comprising a collar adapted to be fixed around an automobile steering column, a locking bolt on the collar adapted to move inwardly of the same, a spring yieldingly opposing said movement, and an adjustable operating medium on the collar adapted to move the bolt inwardly against the pressure of said spring, and a lock operating separate from the locking bolt to secure said medium in its adjusted position.

9. A device of the character described comprising a supporting member adapted for immovable connection, a spring-controlled locking bolt thereon, an adjustable member on the supporting member, in actuative relation to the locking bolt, and a lock operating independent of the bolt for securing the member in its adjusted position.

10. In a device of the class described, a body-member, a locking bolt carried thereon, a swinging member carried on said body-member for actuating said bolt to its effective position, and a lock for securing the swinging member in a predetermined position.

11. In a device of the class described, a clamping member, a spring retracted bolt carried thereon, a swinging member on said clamping member for actuating said bolt to its effective position, and a lock for securing the swinging member in a predetermined position.

12. A device of the character described comprising a supporting member, a locking bolt thereon, an adjustable member in actuative relation to the locking bolt, and a relatively stationary lock for securing the member in its adjusted position.

In testimony whereof I have affixed my signature.

ORVILLE SCOTT HERSHEY.